United States Patent
Wood

(10) Patent No.: US 6,775,685 B1
(45) Date of Patent: Aug. 10, 2004

(54) METHOD AND APPARATUS FOR CALCULATING ENERGY IN A-LAW OR μ-LAW ENCODED SPEECH SIGNALS

(75) Inventor: Robert G. Wood, Ottawa (CA)

(73) Assignee: Zarlink Semiconductor Inc., Ottawa (CA)

( * ) Notice: Subject to any disclaimer, the term of this patent is extended or adjusted under 35 U.S.C. 154(b) by 470 days.

(21) Appl. No.: 09/675,577

(22) Filed: Sep. 29, 2000

(30) Foreign Application Priority Data

Oct. 8, 1999 (GB) .............................................. 9923940

(51) Int. Cl.[7] ................................................. G06F 7/38
(52) U.S. Cl. ....................................................... 708/606
(58) Field of Search ................................. 708/606, 625

(56) References Cited

U.S. PATENT DOCUMENTS

| | | | |
|---|---|---|---|
| 4,283,770 A | | 8/1981 | Stewart |
| 4,357,674 A | | 11/1982 | Ikeda et al. |
| 5,195,052 A | * | 3/1993 | Karim |
| 5,367,702 A | * | 11/1994 | Mahant-Shetti et al. |
| 5,666,301 A | * | 9/1997 | Makino |
| 6,304,890 B1 | * | 10/2001 | Miyasaka et al. |
| 6,347,326 B1 | * | 2/2002 | Jensen et al. |
| 6,463,452 B1 | * | 10/2002 | Schulist ....................... 708/606 |
| 6,510,180 B1 | * | 1/2003 | Peltz ........................... 375/241 |
| 6,523,055 B1 | * | 2/2003 | Yu et al. |

FOREIGN PATENT DOCUMENTS

EP          0 935 203 A2    8/1999

* cited by examiner

*Primary Examiner*—Tan V. Mai
(74) *Attorney, Agent, or Firm*—Beyer Weaver & Thomas, LLP

(57) ABSTRACT

An apparatus and method for generating the square of a non-linear encoded signal having a value and a segment number includes an offset generator, a multiplier and a shifter. The offset generator receives the value of the encoded signal and adds an offset value to it thereby to generate a multiplicand. The multiplicand is squared by the multiplier and the output of the multiplier is conveyed to the shifter. The shifter shifts the output of the multiplier in accordance with the segment number thereby to generate the square of the encoded signal. The offset, multiplying and shifting steps can be performed in a single clock cycle.

16 Claims, 2 Drawing Sheets

METHOD AND APPARATUS FOR CALCULATING ENERGY IN A-LAW OR µ-LAW ENCODED SPEECH SIGNALS

FIELD OF THE INVENTION

The present invention relates in general to digital voice communication systems, and more particularly to a method and apparatus for generating the mathematical square (i.e. energy) of a non-linear encoded signal.

BACKGROUND OF THE INVENTION

Digitized voice samples may be encoded into 8 bit values according to µ-law or A-law compression formats as defined by ITU recommendation G.711. Since the encoding is not linear, in order to perform arithmetic operations (e.g. squaring) upon a voice sample, it must first be expanded to a 13 bit signed linear value.

Two basic approaches have been used in the prior art for generating the square of G.711 encoded data. According to a first approach, a look-up table is constructed with 256 values representing the squares of the respective encoded values, each value being 26 bits wide. The values in the look-up table are indexed by the encoded value. The table is divided into 128 values for A-law encoding and 128 values for µ-law encoding. Since the output values represent the square of a signal sample, the sign bit can be ignored. The look-up table approach may be implemented in software with a CASE statement or in hardware employing a ROM.

The software look-up table approach, which requires a processor and memory resources, takes several clock cycles to generate the square. As a result, this look-up table approach suffers from the disadvantage that considerable computation time is required to locate and output the value from the look-up table. The hardware implementation of the look-up table approach is not always possible as not all integrated circuit technologies are capable of providing the necessary ROM circuitry such as many FPGA technologies and ASIC technologies without embedded core capabilities.

Another approach for generating the square of G.711 encoded data utilizes circuitry for converting the sample back to a linear value, and then performing an arithmetic squaring function on the linear value. This approach suffers from the disadvantage that the hardware circuitry is large, thereby occupying valuable circuit real estate.

It is therefore an object of the present invention to provide a novel apparatus and method for generating the square of a non-linear encoded signal.

SUMMARY OF THE INVENTION

According to the present invention, a method and apparatus are provided for performing a squaring operation in hardware on a non-linear encoded signal, without first linearizing the sample, thereby saving a considerable amount of circuitry and enhancing performance relative to the prior art.

More particularly, in one aspect of the present invention there is provided an apparatus for generating the square of a non-linear encoded signal including a value and a segment number, said apparatus comprising:

an offset generator receiving the value of said encoded signal and adding an offset value thereto thereby to generate a multiplicand;

a multiplier receiving said multiplicand and generating the square thereof; and a shifter shifting said square in accordance with the segment number of said encoded signal thereby to generate the square of said encoded signal.

In a preferred embodiment, the encoded signal is A-law or µ-law encoded. When the signal is A-law encoded, the offset value added to the value of the encoded signal is equal to zero. When the signal is µ-law encoded, the offset value added to the value of the encoded signal is dependent on the segment number of the encoded signal.

According to another aspect of the present invention there is provided a method for generating the square of a non-linear encoded signal including a value and a segment number comprising the steps of:

adding an offset value to the value of said signal to generate a multiplicand;

squaring the multiplicand; and shifting the square of the multiplicand in accordance with the segment number of said signal thereby to generate the square of said encoded signal.

According to yet another aspect of the present invention there is provided a method for generating the square of an A-law encoded signal including a value and a segment number comprising the steps of:

squaring the value of said encoded signal; and shifting the square in accordance with the segment number thereby to generate the square of said encoded signal.

According to still yet another aspect of the present invention there is provided a method for generating the square of a µ-law encoded signal including a value and a segment number comprising the steps of:

adding an offset value to the value of said signal dependent on the segment number to generate a multiplicand;

squaring the multiplicand; and shifting the square of multiplicand in accordance with the segment number of said signal thereby to generate the square of said encoded signal.

BRIEF DESCRIPTION OF THE DRAWINGS

A preferred embodiment of the present invention will now be described more fully with reference to the accompanying drawings, in which.

DETAILED DESCRIPTION OF THE PREFERRED EMBODIMENT

The present invention relates to an apparatus and method for squaring a non-linear, A-law or µ-law encoded sample without firstly requiring the sample to be linearized. As a result a considerable amount of circuitry is saved and performance is enhanced. For ease of understanding, prior art software and hardware approaches for squaring A-law or µ-law encoded samples will firstly be described.

Figure 1:
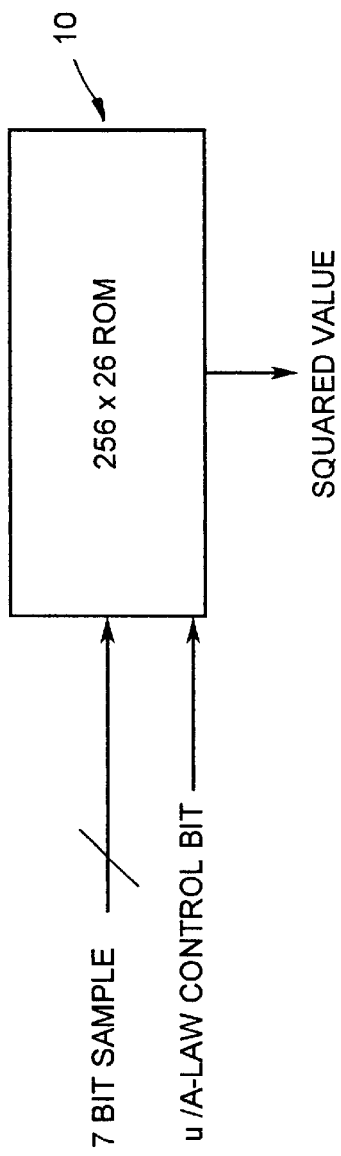
FIG. 1 is a block diagram of a prior art software implementation of a sample squaring circuit.

With reference to FIG. 1, a ROM circuit 10 is shown for generating the square of an A-law or µ-law encoded signal sample. As described above, the ROM circuit 10 contains a look-up table constructed with 256 values representing the squares of the respective encoded values, each value being 26 bits wide. The values in the look-up table are indexed by the encoded value (i.e. a 7 bit signal sample). The look-up table is divided into 128 values for A-law encoding and 128 values for µ-law encoding. A µ/A law control bit is used to toggle between the two 128-bit tables (i.e. the control bit is used as the most significant address bit when addressing the ROM circuit).

Figure 2:
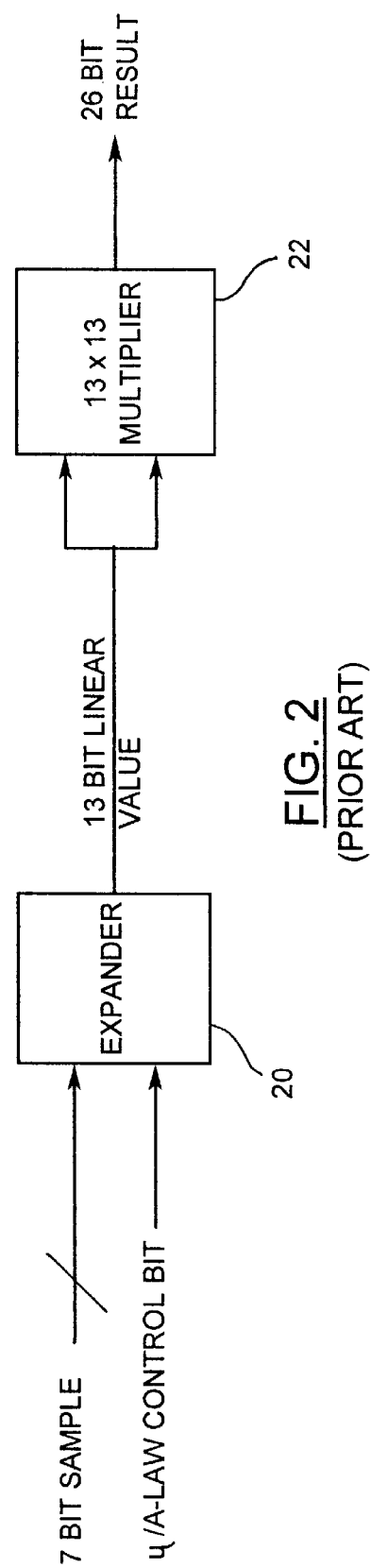
FIG. 2 is a block diagram of a prior art hardware implementation of a sample squaring circuit.

The prior art hardware approach is illustrated in FIG. 2 and includes an expander 20 and a multiplier 22. The expander 20 is used to re-generate a 13 bit linear value from the G.711 encoded 7 bit sample. The re-generated 13 bit linear value is then fed to the 13×13 multiplier 22 which in turn generates the square of the encoded signal sample. As discussed above, the hardware utilized is expensive, and the use of a wide multiplier degrades system performance.

Figure 3:
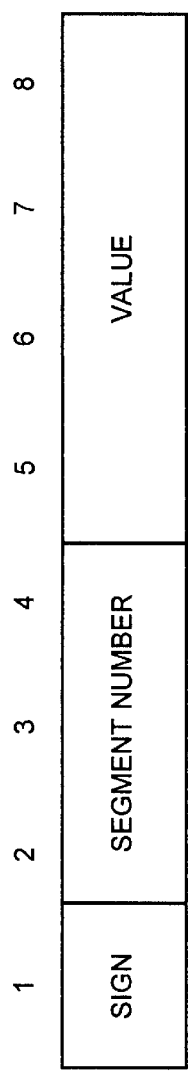
FIG. 3 is a representation of a G.711 encoded sample.

The general format of G.711 encoded data, A-law or µ-law, is shown in FIG. 3. The most significant bit is a sign bit; the next three bits are a segment number, and the lowest four bits (five bits for segment 1 of A-law) represent the value. The segment number is effectively a multiplier of the value, for both µ-law and A-law encoding.

Figure 4:
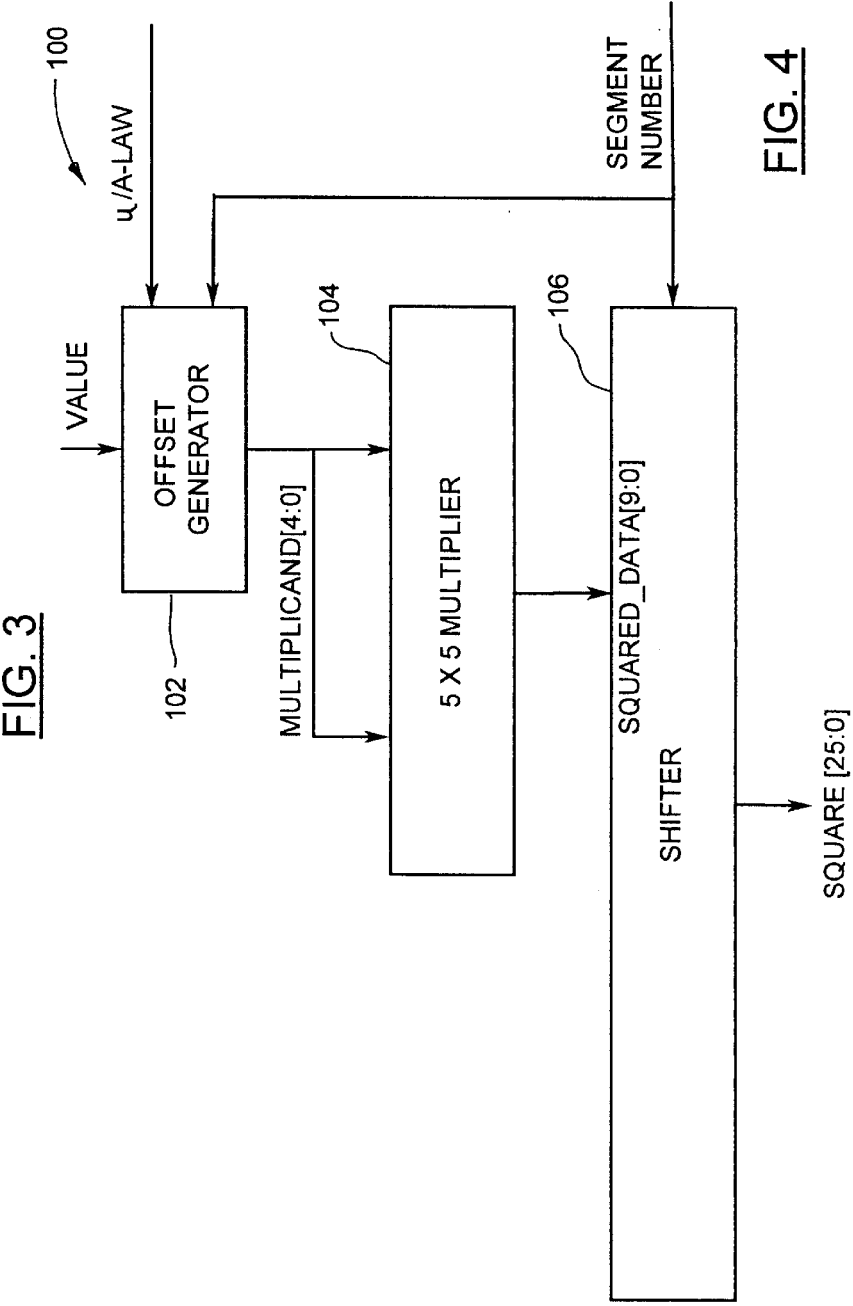
FIG. 4 is a block diagram of an apparatus for squaring a G.711 encoded sample in accordance with the present invention.

Turning now to FIG. 4, an apparatus for squaring a non-linear, A-law or µ-law encoded sample in accordance with the present invention is shown and is generally indicated by reference number 100. The apparatus 100 is implemented in hardware and performs the squaring function without firstly requiring the sample to be linearized. As can be seen, the apparatus 100 includes an offset generator 102, a five bit multiplier 104 and a shifter 106. The offset generator 102 receives the four value bits (5 bits for segment 1 of A-law) and the segment number of the G.711 encoded sample, as well as the aforementioned µ/A-law control bit. The offset generator 102 dynamically switches to operate either in A-law or µ-law in response to the µ/A-law control bit. A five bit multiplicand is generated by the offset generator 102 by adding an offset to the input value. For A-law, the offset is zero and for µ-law, the offset is dependent upon the segment number as given in G.711. The five bit multiplier 104 squares the multiplicand and outputs the square to the shifter 106. The shifter 106 in turn shifts the square in accordance with the segment number as given in G.711, to provide a 26 bit square of the sample. The sign bit is ignored. The offset, square and shift operations can be performed in a single clock cycle making the apparatus 100 faster than prior art sample squaring circuits.

The following verilog code describes the function of each element shown in FIG. 4. The apparatus 100 can be synthesized to yield an implementation of only 410×2 input NAND-gates:

```
reg interval_mask;                    // this is used to disable the upper interval bit
                                      //when not segment 1 of the A-law (which
   requires 5 bits)
reg [4:0] multiplicand;               //this is used to generate the square of the interval
bits
reg [7:0] sample;                     //this is the companded ITU data
reg ULAW;                             //1 = µ-law encoding 0 = A-law encoding.
wire sign;
   //This section represents the offset generator
   assign sign = sample[7];
   always @(sample or ULAW)
   begin
       if(ULAW)                       //µ-law case
       begin
          multiplicand[3:0] = ~sample[3:0];
              case(sample[6:4])
                  3'd7: multiplicand[4] = 0;
//segment 1
                  3'd6: multiplicand[4:3] = {1'b0,~sample[3]} + 2'b01;
                       //segment 2
                  3'd5: multiplicand[4:2] = {1'b0,~sample[3:2]} + 3'b011;
                       //segment 3
                  3'd4: multiplicand[4:1] = {1'b0,~sample[3:1]} + 4'b0111;
                       //segment 4
                  3'd3: multiplicand[4:0] = {1'b0,~sample[3:0]} + 5'b01111;
                       //segment 5
                  default: multiplicand[4] = 1;
              endcase
       end
       else                           //A-law case
       begin
           interval_mask = (~sample[6] & ~sample[5]);
           multiplicand = {((interval_mask & sample[4]) | ~interval_mask),(sample[3:0])};
       end
   end
//this section represents the multiplier
always @(multiplicand) squared_data[9:0] = multiplicand * multiplicand;
//This section performs the shifting of the product to generate the final squared value
always @(squared_data or ULAW)
begin
     output_data = 0;                 //this ensures all non-defined bits are forced to
zero.
     //then set the output data according to appropriate companding law
     if(~ULAW)                        //A-law case follows
     begin
         case(sample[6:4])
```

-continued

```
            3'd0: output_data[11:2] = squared_data[9:0];
            3'd1: output_data[11:2] = squared_data[9:0];
            3'd2: output_data[13:4] = squared_data[9:0];
            3'd3: output_data[15:6] = squared_data[9:0];
            3'd4: output_data[17:8] = squared_data[9:0];
            3'd5: output_data[19:10] = squared_data[9:0];
            3'd6: output_data[21:12] = squared_data[9:0];
            3'd7: output_data[23:14] = squared_data[9:0];
        endcase
    end
    else                              //µ-law case follows
    begin
        case(sample[6:4])    //µ-law case follows
            3'd7: output_data[11:2] = squared_data[9:0];
            3'd6: output_data[13:4] = squared_data[9:0];
            3'd5: output_data[15:6] = squared_data[9:0];
            3'd4: output_data[17:8] = squared_data[9:0];
            3'd3: output_data[19:10] = squared_data[9:0];
            3'd2: output_data[21:12] = squared_data[9:0];
            3'd1: output_data[23:14] = squared_data[9:0];
            3'd0: output_data[25:16] = squared_data[9:0];
        endcase
    end
```

The implementation set forth above provides an exact solution for A-law encoding since each segment resides on a binary boundary (i.e. segments 1 to 7 starting at 0, 64, 128, 256, 512, 1024 and 2048). The µ-law solution is not exact since segments 1–8 start at the following values: 32, 96, 224, 480, 992. 2016 and 4064. The preferred implementation set forth above results in each sample value having errors as defined in the following table:

| sample | squared_data | exact_square | error percentage |
|---|---|---|---|
| 00000000 | 62980096 | 62457409 | 8.368695E−01 |
| 00000001 | 58982400 | 58476609 | 8.649458E−01 |
| 00000010 | 55115776 | 54626881 | 8.949715E−01 |
| 00000011 | 51380224 | 50908225 | 9.271567E−01 |
| 00000100 | 47775744 | 47320641 | 9.617431E−01 |
| 00000101 | 44302336 | 43864129 | 9.990099E−01 |
| 00000110 | 40960000 | 40538689 | 1.039281E+00 |
| 00000111 | 37748736 | 37344321 | 1.082936E+00 |
| 00001000 | 34668544 | 34281025 | 1.130418E+00 |
| 00001001 | 31719424 | 31348801 | 1.182256E+00 |
| 00001010 | 28901376 | 28547649 | 1.239076E+00 |
| 00001011 | 26214400 | 25877569 | 1.301633E+00 |
| 00001100 | 23658496 | 23338561 | 1.370843E+00 |
| 00001101 | 21233664 | 20930625 | 1.447826E+00 |
| 00001110 | 18939904 | 18653761 | 1.533969E+00 |
| 00001111 | 16777216 | 16507969 | 1.631012E+00 |
| 00010000 | 15745024 | 15484225 | 1.684288E+00 |
| 00010001 | 14745600 | 14493249 | 1.741162E+00 |
| 00010010 | 13778944 | 13535041 | 1.802012E+00 |
| 00010011 | 12845056 | 12609601 | 1.867268E+00 |
| 00010100 | 11943936 | 11716929 | 1.937427E+00 |
| 00010101 | 11075584 | 10857025 | 2.013065E+00 |
| 00010110 | 10240000 | 10029889 | 2.094849E+00 |
| 00010111 | 9437184 | 9235521 | 2.183558E+00 |
| 00011000 | 8667136 | 8473921 | 2.280113E+00 |
| 00011001 | 7929856 | 7745089 | 2.385602E+00 |
| 00011010 | 7225344 | 7049025 | 2.501325E+00 |
| 00011011 | 6553600 | 6385729 | 2.628846E+00 |
| 00011100 | 5914624 | 5755201 | 2.770068E+00 |
| 00011101 | 5308416 | 5157441 | 2.927324E+00 |
| 00011110 | 4734976 | 4592449 | 3.103508E+00 |
| 00011111 | 4194304 | 4060225 | 3.302255E+00 |
| 00100000 | 3936256 | 3806401 | 3.411490E+00 |
| 00100001 | 3686400 | 3560769 | 3.528199E+00 |
| 00100010 | 3444736 | 3323329 | 3.653174E+00 |
| 00100011 | 3211264 | 3094081 | 3.787328E+00 |
| 00100100 | 2985984 | 2873025 | 3.931710E+00 |
| 00100101 | 2768896 | 2660161 | 4.087535E+00 |
| 00100110 | 2560000 | 2455489 | 4.256219E+00 |
| 00100111 | 2359296 | 2259009 | 4.439425E+00 |
| 00101000 | 2166784 | 2070721 | 4.639109E+00 |
| 00101001 | 1982464 | 1890625 | 4.857600E+00 |
| 00101010 | 1806336 | 1718721 | 5.097686E+00 |
| 00101011 | 1638400 | 1555009 | 5.362734E+00 |

-continued

| | | | |
|---|---|---|---|
| sample 00101100 | squared_data 1478656 | exact_square 1399489 | error percentage 5.656850E+00 |
| sample 00101101 | squared_data 1327104 | exact_square 1252161 | error percentage 5.985093E+00 |
| sample 00101110 | squared_data 1183744 | exact_square 1113025 | error percentage 6.353766E+00 |
| sample 00101111 | squared_data 1048576 | exact_square 982081 | error percentage 6.770826E+00 |
| sample 00110000 | squared_data 921600 | exact_square 919681 | error percentage 2.086593E−01 |
| sample 00110001 | squared_data 861184 | exact_square 859329 | error percentage 2.158661E−01 |
| sample 00110010 | squared_data 802816 | exact_square 801025 | error percentage 2.235885E−01 |
| sample 00110011 | squared_data 746496 | exact_square 744769 | error percentage 2.318840E−01 |
| sample 00110100 | squared_data 692224 | exact_square 690561 | error percentage 2.408187E−01 |
| sample 00110101 | squared_data 640000 | exact_square 638401 | error percentage 2.504695E−01 |
| sample 00110110 | squared_data 589824 | exact_square 588289 | error percentage 2.609262E−01 |
| sample 00110111 | squared_data 541696 | exact_square 540225 | error percentage 2.722940E−01 |
| sample 00111000 | squared_data 495616 | exact_square 494209 | error percentage 2.846974E−01 |
| sample 00111001 | squared_data 451584 | exact_square 450241 | error percentage 2.982847E−01 |
| sample 00111010 | squared_data 409600 | exact_square 408321 | error percentage 3.132340E−01 |
| sample 00111011 | squared_data 369664 | exact_square 368449 | error percentage 3.297607E−01 |
| sample 00111100 | squared_data 331776 | exact_square 330625 | error percentage 3.481285E−01 |
| sample 00111101 | squared_data 295936 | exact_square 294849 | error percentage 3.686633E−01 |
| sample 00111110 | squared_data 262144 | exact_square 261121 | error percentage 3.917724E−01 |
| sample 00111111 | squared_data 230400 | exact_square 229441 | error percentage 4.179724E−01 |
| sample 01000000 | squared_data 215296 | exact_square 214369 | error percentage 4.324319E−01 |
| sample 01000001 | squared_data 200704 | exact_square 199809 | error percentage 4.479278E−01 |
| sample 01000010 | squared_data 186624 | exact_square 185761 | error percentage 4.645754E−01 |
| sample 01000011 | squared_data 173056 | exact_square 172225 | error percentage 4.825083E−01 |
| sample 01000100 | squared_data 160000 | exact_square 159201 | error percentage 5.018813E−01 |
| sample 01000101 | squared_data 147456 | exact_square 146689 | error percentage 5.228749E−01 |
| sample 01000110 | squared_data 135424 | exact_square 134689 | error percentage 5.457016E−01 |
| sample 01000111 | squared_data 123904 | exact_square 123201 | error percentage 5.706123E−01 |
| sample 01001000 | squared_data 112896 | exact_square 112225 | error percentage 5.979060E−01 |
| sample 01001001 | squared_data 102400 | exact_square 101761 | error percentage 6.279419E−01 |
| sample 01001010 | squared_data 92416 | exact_square 91809 | error percentage 6.611552E−01 |
| sample 01001011 | squared_data 82944 | exact_square 82369 | error percentage 6.980782E−01 |
| sample 01001100 | squared_data 73984 | exact_square 73441 | error percentage 7.393690E−01 |
| sample 01001101 | squared_data 65536 | exact_square 65025 | error percentage 7.858516E−01 |
| sample 01001110 | squared_data 57600 | exact_square 57121 | error percentage 8.385708E−01 |
| sample 01001111 | squared_data 50176 | exact_square 49729 | error percentage 8.988719E−01 |
| sample 01010000 | squared_data 46656 | exact_square 46225 | error percentage 9.323959E−01 |
| sample 01010001 | squared_data 43264 | exact_square 42849 | error percentage 9.685174E−01 |
| sample 01010010 | squared_data 40000 | exact_square 39601 | error percentage 1.007550E+00 |
| sample 01010011 | squared_data 36864 | exact_square 36481 | error percentage 1.049862E+00 |
| sample 01010100 | squared_data 33856 | exact_square 33489 | error percentage 1.095882E+00 |
| sample 01010101 | squared_data 30976 | exact_square 30625 | error percentage 1.146122E+00 |
| sample 01010110 | squared_data 28224 | exact_square 27889 | error percentage 1.201190E+00 |
| sample 01010111 | squared_data 25600 | exact_square 25281 | error percentage 1.261817E+00 |
| sample 01011000 | squared_data 23104 | exact_square 22801 | error percentage 1.328889E+00 |
| sample 01011001 | squared_data 20736 | exact_square 20449 | error percentage 1.403492E+00 |
| sample 01011010 | squared_data 18496 | exact_square 18225 | error percentage 1.486968E+00 |
| sample 01011011 | squared_data 16384 | exact_square 16129 | error percentage 1.581003E+00 |
| sample 01011100 | squared_data 14400 | exact_square 14161 | error percentage 1.687734E+00 |
| sample 01011101 | squared_data 12544 | exact_square 12321 | error percentage 1.809918E+00 |
| sample 01011110 | squared_data 10816 | exact_square 10609 | error percentage 1.951174E+00 |
| sample 01011111 | squared_data 9216 | exact_square 9025 | error percentage 2.116343E+00 |
| sample 01100000 | squared_data 8464 | exact_square 8281 | error percentage 2.209878E+00 |
| sample 01100001 | squared_data 7744 | exact_square 7569 | error percentage 2.312062E+00 |
| sample 01100010 | squared_data 7056 | exact_square 6889 | error percentage 2.424154E+00 |
| sample 01100011 | squared_data 6400 | exact_square 6241 | error percentage 2.547669E+00 |
| sample 01100100 | squared_data 5776 | exact_square 5625 | error percentage 2.684444E+00 |
| sample 01100101 | squared_data 5184 | exact_square 5041 | error percentage 2.836739E+00 |
| sample 01100110 | squared_data 4624 | exact_square 4489 | error percentage 3.007351E+00 |
| sample 01100111 | squared_data 4096 | exact_square 3969 | error percentage 3.199798E+00 |
| sample 01101000 | squared_data 3600 | exact_square 3481 | error percentage 3.418558E+00 |
| sample 01101001 | squared_data 3136 | exact_square 3025 | error percentage 3.669421E+00 |
| sample 01101010 | squared_data 2704 | exact_square 2601 | error percentage 3.960015E+00 |
| sample 01101011 | squared_data 2304 | exact_square 2209 | error percentage 4.300589E+00 |
| sample 01101100 | squared_data 1936 | exact_square 1849 | error percentage 4.705246E+00 |
| sample 01101101 | squared_data 1600 | exact_square 1521 | error percentage 5.193951E+00 |
| sample 01101110 | squared_data 1296 | exact_square 1225 | error percentage 5.795918E+00 |
| sample 01101111 | squared_data 1024 | exact_square 961 | error percentage 6.555671E+00 |
| sample 01110000 | squared_data 900 | exact_square 900 | error percentage 0.000000E+00 |
| sample 01110001 | squared_data 784 | exact_square 784 | error percentage 0.000000E+00 |
| sample 01110010 | squared_data 676 | exact_square 676 | error percentage 0.000000E+00 |
| sample 01110011 | squared_data 576 | exact_square 576 | error percentage 0.000000E+00 |
| sample 01110100 | squared_data 484 | exact_square 484 | error percentage 0.000000E+00 |
| sample 01110101 | squared_data 400 | exact_square 400 | error percentage 0.000000E+00 |
| sample 01110110 | squared_data 324 | exact_square 324 | error percentage 0.000000E+00 |
| sample 01110111 | squared_data 256 | exact_square 256 | error percentage 0.000000E+00 |
| sample 01111000 | squared_data 196 | exact_square 196 | error percentage 0.000000E+00 |
| sample 01111001 | squared_data 144 | exact_square 144 | error percentage 0.000000E+00 |
| sample 01111010 | squared_data 100 | exact_square 100 | error percentage 0.000000E+00 |

-continued

| sample | squared_data | exact_square | error percentage |
|---|---|---|---|
| sample 01111011 | squared_data 64 | exact_square 64 | error percentage 0.000000E+00 |
| sample 01111100 | squared_data 36 | exact_square 36 | error percentage 0.000000E+00 |
| sample 01111101 | squared_data 16 | exact_square 16 | error percentage 0.000000E+00 |
| sample 01111110 | squared_data 4 | exact_square 4 | error percentage 0.000000E+00 |
| sample 01111111 | squared_data 0 | exact_square 0 | error percentage 0.000000E+00 |
| sample 10000000 | squared_data 62980096 | exact_square 62457409 | error percentage 8.368695E-01 |
| sample 10000001 | squared_data 58982400 | exact_square 58476609 | error percentage 8.649458E-01 |
| sample 10000010 | squared_data 55115776 | exact_square 54626881 | error percentage 8.949715E-01 |
| sample 10000011 | squared_data 51380224 | exact_square 50908225 | error percentage 9.271567E-01 |
| sample 10000100 | squared_data 47775744 | exact_square 47320641 | error percentage 9.617431E-01 |
| sample 10000101 | squared_data 44302336 | exact_square 43864129 | error percentage 9.990099E-01 |
| sample 10000110 | squared_data 40960000 | exact_square 40538689 | error percentage 1.039281E+00 |
| sample 10000111 | squared_data 37748736 | exact_square 37344321 | error percentage 1.082936E+00 |
| sample 10001000 | squared_data 34668544 | exact_square 34281025 | error percentage 1.130418E+00 |
| sample 10001001 | squared_data 31719424 | exact_square 31348801 | error percentage 1.182256E+00 |
| sample 10001010 | squared_data 28901376 | exact_square 28547649 | error percentage 1.239076E+00 |
| sample 10001011 | squared_data 26214400 | exact_square 25877569 | error percentage 1.301633E+00 |
| sample 10001100 | squared_data 23658496 | exact_square 23338561 | error percentage 1.370843E+00 |
| sample 10001101 | squared_data 21233664 | exact_square 20930625 | error percentage 1.447826E+00 |
| sample 10001110 | squared_data 18939904 | exact_square 18653761 | error percentage 1.533969E+00 |
| sample 10001111 | squared_data 16777216 | exact_square 16507969 | error percentage 1.631012E+00 |
| sample 10010000 | squared_data 15745024 | exact_square 15484225 | error percentage 1.684288E+00 |
| sample 10010001 | squared_data 14745600 | exact_square 14493249 | error percentage 1.741162E+00 |
| sample 10010010 | squared_data 13778944 | exact_square 13535041 | error percentage 1.802012E+00 |
| sample 10010011 | squared_data 12845056 | exact_square 12609601 | error percentage 1.867268E+00 |
| sample 10010100 | squared_data 11943936 | exact_square 11716929 | error percentage 1.937427E+00 |
| sample 10010101 | squared_data 11075584 | exact_square 10857025 | error percentage 2.013065E+00 |
| sample 10010110 | squared_data 10240000 | exact_square 10029889 | error percentage 2.094849E+00 |
| sample 10010111 | squared_data 9437184 | exact_square 9235521 | error percentage 2.183558E+00 |
| sample 10011000 | squared_data 8667136 | exact_square 8473921 | error percentage 2.280113E+00 |
| sample 10011001 | squared_data 7929856 | exact_square 7745089 | error percentage 2.385602E+00 |
| sample 10011010 | squared_data 7225344 | exact_square 7049025 | error percentage 2.501325E+00 |
| sample 10011011 | squared_data 6553600 | exact_square 6385729 | error percentage 2.628846E+00 |
| sample 10011100 | squared_data 5914624 | exact_square 5755201 | error percentage 2.770068E+00 |
| sample 10011101 | squared_data 5308416 | exact_square 5157441 | error percentage 2.927324E+00 |
| sample 10011110 | squared_data 4734976 | exact_square 4592449 | error percentage 3.103508E+00 |
| sample 10011111 | squared_data 4194304 | exact_square 4060225 | error percentage 3.302255E+00 |
| sample 10100000 | squared_data 3936256 | exact_square 3806401 | error percentage 3.411490E+00 |
| sample 10100001 | squared_data 3686400 | exact_square 3560769 | error percentage 3.528199E+00 |
| sample 10100010 | squared_data 3444736 | exact_square 3323329 | error percentage 3.653174E+00 |
| sample 10100011 | squared_data 3211264 | exact_square 3094081 | error percentage 3.787328E+00 |
| sample 10100100 | squared_data 2985984 | exact_square 2873025 | error percentage 3.931710E+00 |
| sample 10100101 | squared_data 2768896 | exact_square 2660161 | error percentage 4.087535E+00 |
| sample 10100110 | squared_data 2560000 | exact_square 2455489 | error percentage 4.256219E+00 |
| sample 10100111 | squared_data 2359296 | exact_square 2259009 | error percentage 4.439425E+00 |
| sample 10101000 | squared_data 2166784 | exact_square 2070721 | error percentage 4.639109E+00 |
| sample 10101001 | squared_data 1982464 | exact_square 1890625 | error percentage 4.857600E+00 |
| sample 10101010 | squared_data 1806336 | exact_square 1718721 | error percentage 5.097686E+00 |
| sample 10101011 | squared_data 1638400 | exact_square 1555009 | error percentage 5.362734E+00 |
| sample 10101100 | squared_data 1478656 | exact_square 1399489 | error percentage 5.656850E+00 |
| sample 10101101 | squared_data 1327104 | exact_square 1252161 | error percentage 5.985093E+00 |
| sample 10101110 | squared_data 1183744 | exact_square 1113025 | error percentage 6.353766E+00 |
| sample 10101111 | squared_data 1048576 | exact_square 982081 | error percentage 6.770826E+00 |
| sample 10110000 | squared_data 921600 | exact_square 919681 | error percentage 2.086593E-01 |
| sample 10110001 | squared_data 861184 | exact_square 859329 | error percentage 2.158661E-01 |
| sample 10110010 | squared_data 802816 | exact_square 801025 | error percentage 2.235885E-01 |
| sample 10110011 | squared_data 746496 | exact_square 744769 | error percentage 2.318840E-01 |
| sample 10110100 | squared_data 692224 | exact_square 690561 | error percentage 2.408187E-01 |
| sample 10110101 | squared_data 640000 | exact_square 638401 | error percentage 2.504695E-01 |
| sample 10110110 | squared_data 589824 | exact_square 588289 | error percentage 2.609262E-01 |
| sample 10110111 | squared_data 541696 | exact_square 540225 | error percentage 2.722940E-01 |
| sample 10111000 | squared_data 495616 | exact_square 494209 | error percentage 2.846974E-01 |
| sample 10111001 | squared_data 451584 | exact_square 450241 | error percentage 2.982847E-01 |
| sample 10111010 | squared_data 409600 | exact_square 408321 | error percentage 3.132340E-01 |
| sample 10111011 | squared_data 369664 | exact_square 368449 | error percentage 3.297607E-01 |
| sample 10111100 | squared_data 331776 | exact_square 33062 | error percentage 3.481285E-01 |
| sample 10111101 | squared_data 295936 | exact_square 29489 | error percentage 3.686633E-01 |
| sample 10111110 | squared_data 262144 | exact_square 26121 | error percentage 3.917724E-01 |
| sample 10111111 | squared_data 230400 | exact_square 22441 | error percentage 4.179724E-01 |
| sample 11000000 | squared_data 215296 | exact_square 24369 | error percentage 4.324526E-01 |
| sample 11000001 | squared_data 200704 | exact_square 99809 | error percentage 4.479278E-01 |
| sample 11000010 | squared_data 186624 | exact_square 185761 | error percentage 4.645754E-01 |
| sample 11000011 | squared_data 173056 | exact_square 172225 | error percentage 4.825083E-01 |
| sample 11000100 | squared_data 160000 | exact_square 159201 | error percentage 5.018813E-01 |
| sample 11000101 | squared_data 147456 | exact_square 146689 | error percentage 5.228749E-01 |
| sample 11000110 | squared_data 135424 | exact_square 134689 | error percentage 5.457016E-01 |
| sample 11000111 | squared_data 123904 | exact_square 123201 | error percentage 5.706123E-01 |
| sample 11001000 | squared_data 112896 | exact_square 112225 | error percentage 5.979060E-01 |
| sample 11001001 | squared_data 102400 | exact_square 101761 | error percentage 6.279419E-01 |

-continued

| sample | squared_data | exact_square | error percentage |
|---|---|---|---|
| sample 11001010 | squared_data 92416 | exact_square 91809 | error percentage 6.611552E−01 |
| sample 10010111 | squared_data 82944 | exact_square 82369 | error percentage 6.980782E−01 |
| sample 11001100 | squared_data 73984 | exact_square 73441 | error percentage 7.393690E−01 |
| sample 11001101 | squared_data 65536 | exact_square 65025 | error percentage 7.858516E−01 |
| sample 11001110 | squared_data 57600 | exact_square 57121 | error percentage 8.385708E−01 |
| sample 11001111 | squared_data 50176 | exact_square 49729 | error percentage 8.998719E−01 |
| sample 11010000 | squared_data 46656 | exact_square 46225 | error percentage 9.323959E−01 |
| sample 11010001 | squared_data 43264 | exact_square 42849 | error percentage 9.685174E−01 |
| sample 11010010 | squared_data 40000 | exact_square 39601 | error percentage 1.007550E+00 |
| sample 11010011 | squared_data 36864 | exact_square 36481 | error percentage 1.049862E+00 |
| sample 11010100 | squared_data 3385 | exact_square 33489 | error percentage 1.095882E+00 |
| sample 11010101 | squared_data 3096 | exact_square 30625 | error percentage 1.146122E+00 |
| sample 11010110 | squared_data 2824 | exact_square 27889 | error percentage 1.201190E+00 |
| sample 11010111 | squared_data 2600 | exact_square 25281 | error percentage 1.261817E+00 |
| sample 11011000 | squared_data 3104 | exact_square 22801 | error percentage 1.328889E+00 |
| sample 11011001 | squared_data 20736 | exact_square 20449 | error percentage 1.403492E+00 |
| sample 11011010 | squared_data 18496 | exact_square 18225 | error percentage 1.486968E+00 |
| sample 11011011 | squared_data 16384 | exact_square 16129 | error percentage 1.581003E+00 |
| sample 11011100 | squared_data 14400 | exact_square 14161 | error percentage 1.687734E+00 |
| sample 11011101 | squared_data 12544 | exact_square 12321 | error percentage 1.809918E+00 |
| sample 11011110 | squared_data 10816 | exact_square 10609 | error percentage 1.951174E+00 |
| sample 11011111 | squared_data 9216 | exact_square 9025 | error percentage 2.116343E+00 |
| sample 11100000 | squared_data 8464 | exact_square 8281 | error percentage 2.209878E+00 |
| sample 11100001 | squared_data 7744 | exact_square 7569 | error percentage 2.312062E+00 |
| sample 11100010 | squared_data 7056 | exact_square 6889 | error percentage 2.424154E+00 |
| sample 11100011 | squared_data 6400 | exact_square 6241 | error percentage 2.547669E+00 |
| sample 11100100 | squared_data 5776 | exact_square 5625 | error percentage 2.684444E+00 |
| sample 11100101 | squared_data 5184 | exact_square 5041 | error percentage 2.836739E+00 |
| sample 11100110 | squared_data 4624 | exact_square 4489 | error percentage 3.007351E+00 |
| sample 11100111 | squared_data 4096 | exact_square 3969 | error percentage 3.199798E+00 |
| sample 11101000 | squared_data 3600 | exact_square 3481 | error percentage 3.418558E+00 |
| sample 11101001 | squared_data 3136 | exact_square 3025 | error percentage 3.669421E+00 |
| sample 11101010 | squared_data 2704 | exact_square 2601 | error percentage 3.960015E+00 |
| sample 1110101 | squared_data 2304 | exact_square 2209 | error percentage 4.300589E+00 |
| sample 1110110 | squared_data 1936 | exact_square 1849 | error percentage 4.705246E+00 |
| sample 1110101 | squared_data 1600 | exact_square 1521 | error percentage 5.193951E+00 |
| sample 1110110 | squared_data 1296 | exact_square 1225 | error percentage 5.795918E+00 |
| sample 1111111 | squared_data 1024 | exact_square 961 | error percentage 6.555671E+00 |
| sample 1110000 | squared_data 900 | exact_square 900 | error percentage 0.000000E+00 |
| sample 1110001 | squared_data 784 | exact_square 784 | error percentage 0.000000E+00 |
| sample 1110010 | squared_data 676 | exact_square 676 | error percentage 0.000000E+00 |
| sample 11110011 | squared_data 576 | exact_square 576 | error percentage 0.000000E+00 |
| sample 11110100 | squared_data 484 | exact_square 484 | error percentage 0.000000E+00 |
| sample 11110101 | squared_data 400 | exact_square 400 | error percentage 0.000000E+00 |
| sample 11110110 | squared_data 324 | exact_square 324 | error percentage 0.000000E+00 |
| sample 11110111 | squared_data 256 | exact_square 256 | error percentage 0.000000E+00 |
| sample 11111000 | squared_data 196 | exact_square 196 | error percentage 0.000000E+00 |
| sample 11111001 | squared_data 144 | exact_square 144 | error percentage 0.000000E+00 |
| sample 11111010 | squared_data 100 | exact_square 100 | error percentage 0.000000E+00 |
| sample 11111100 | squared_data 36 | exact_square 36 | error percentage 0.000000E+00 |
| sample 11111101 | squared_data 16 | exact_square 16 | error percentage 0.000000E+00 |
| sample 11111110 | squared_data 4 | exact_square 4 | error percentage 0.000000E+00 |

However, it will be appreciated from a review of the foregoing table that all errors are less than 7% for $\mu$-law encoding.

By making the offset generator 102 for the $\mu$-law case more precise, the absolute error can be reduced. However, any such improvement is at the expense of making the multiplier 104 wider. At the upper limit of a 13 bit multiplier, the absolute error for the $\mu$-law case can be reduced to zero with the following implementation:

```
multiplicand[12:0] = 0;
case(sample[6:4])
    3'd7: multiplicand[4:1] = ~sample[3:0],                              //segment 1
    3'd6: multiplicand[6:0] = {1'b0,~sample[3:0],2'b0} + 7'b0011111;     //segment 2
    3'd5: multiplicand[7:0] = {1'b0,~sample[3:0],3'b0} + 8'b01011111;    //segment 3
    3'd4: multiplicand[8:0] = {1'b0,~sample[3:0],4'b0} + 9'b011011111;   //segment 4
    3'd3: multiplicand[9:0] = {1'b0,~sample[3:0],5'b0} + 10'b0111011111; //segment 5
    3'd2: multiplicand[10:0] = {1'b0,~sample[3:0],6'b0} + 11'b01111011111; //segment 5
    3'd1: multiplicand[11:0] = {1'b0,~sample[3:0],6'b0} + 12'b011111011111; //segment 5
    3'd0: multiplicand[12:0] = {1'b0,~sample[3:0],8'b0} + 13'b0111111011111; //segment 5
endcase
```

It will be appreciated that, although a particular embodiment of the present invention has been described and illustrated in detail, various changes and modifications may be made. All such changes and modifications may be made without departing from the spirit and scope of the present invention as defined by the claims appended hereto.

What is claimed is:

1. An apparatus for generating the square of a non-linear encoded signal including a value and a segment number, said apparatus comprising:

an offset generator receiving the value of said encoded signal and adding an offset value thereto thereby to generate a multiplicand;

a multiplier receiving said multiplicand and generating the square thereof; and a shifter shifting said square in accordance with the segment number of said encoded signal thereby to generate the square of said encoded signal.

2. An apparatus as defined in claim 1 wherein said offset generator operates in a selected mode depending on the law used to encode the encoded signal, the offset value added to the value of said encoded signal changing depending on said selected mode.

3. An apparatus as defined in claim 2 wherein said offset generator is responsive to a control signal, said offset generator being switched between an A-law mode and a $\mu$-law mode in response to said control signal.

4. An apparatus as defined in claim 3 wherein when said encoded signal is A-law encoded, said offset value is zero and when encoded said signal is $\mu$-law encoded, said offset value is dependent on said segment number.

5. An apparatus as defined in claim 3 wherein said offset generator, said multiplier and said shifter operate to generate the square of said encoded signal in a single clock cycle.

6. An apparatus as defined in claim 2 wherein when said encoded signal is A-law encoded, said offset value is zero and when said encoded signal is $\mu$-law encoded, said offset value is dependent on said segment number.

7. An apparatus as defined in claim 1 wherein said offset generator, said multiplier and said shifter operate to generate the square of said encoded signal in a single clock cycle.

8. A method for generating the square of a non-linear encoded signal including a value and a segment number comprising the steps of:

adding an offset value to the value of said encoded signal using an offset generator to generate a multiplicand;

squaring the multiplicand using a multiplier; and shifting the square of said multiplicand using a shifter that is responsive to the segment number of said encoded signal thereby to generate the square of said encoded signal.

9. The method of claim 8 wherein said offset value is zero when said encoded signal is A-law encoded and wherein said offset value is dependent on the segment number when said encoded signal is $\mu$-law encoded.

10. The method of claim 9 wherein said adding, squaring and shifting steps are performed in a single clock cycle.

11. The method of claim 8 wherein said adding, squaring and shifting steps are performed in a single clock cycle.

12. An apparatus for generating the square of a $\mu$-law encoded signal including a value and a segment number comprising:

means for adding an offset value to the value of said encoded signal dependent on the segment number to generate a multiplicand;

means for squaring the multiplicand; and means for shifting the square of the multiplicand in accordance with the segment number of said encoded signal thereby to generate the square of said encoded signal.

13. An apparatus as defined in claim 12 wherein said means for adding, said means for squaring and said means for shifting perform said adding, squaring and shifting in a single clock cycle.

14. An apparatus for generating the square of a non-linear encoded signal including a value and a segment number, said apparatus comprising:

means for adding an offset to the value of said encoded signal thereby to generate a multiplicand;

means for generating the square of said multiplicand; and means for shifting the square of said multiplicand in accordance with said segment number thereby to generate the square of said non-linear encoded signal.

15. An apparatus as defined in claim 14 wherein said means for adding operates in a selected mode depending on the law used to encode the encoded signal, the offset added to the value of said encoded signal changing depending on said selected mode.

16. An apparatus as defined in claim 15 wherein said means for adding, means for squaring and means for shifting operate to generate the square of said encoded signal in a single clock cycle.

* * * * *